United States Patent [19]

Tolfsen

[11] Patent Number: 4,757,969
[45] Date of Patent: Jul. 19, 1988

[54] SAFETY BELT SYSTEM FOR CARS
[75] Inventor: Ulf Tolfsen, Fredrikstad, Norway
[73] Assignee: Loyd's Industri A/S, Fredrikstad, Norway
[21] Appl. No.: 934,654
[22] Filed: Nov. 25, 1986

[30] Foreign Application Priority Data

Dec. 6, 1985 [NO] Norway ............... 854919

[51] Int. Cl.⁴ .................................. B65D 63/00
[52] U.S. Cl. ........................ 248/499; 280/801; 297/471
[58] Field of Search ........... 248/499, 160; 297/470, 297/471, 472, 485, 468; 280/801

[56] References Cited

U.S. PATENT DOCUMENTS 3,447,833  6/1969  Rice ............................. 297/472
4,150,843  4/1979  Reid et al. ..................... 280/801
4,157,841  6/1979  Bergman et al. ............. 280/801 X
4,645,231  2/1987  Takada .......................... 280/801

FOREIGN PATENT DOCUMENTS 2052373  5/1976  Fed. Rep. of Germany ...... 297/482

Primary Examiner—David L. Talbott
Attorney, Agent, or Firm—Holman & Stern

[57] ABSTRACT

A safety belt system for use in cars and the like, consisting of a fastener, a belt, and highly flexible fixing device for securing to the fixed car structures. The fixing device comprises a core a fibrous material completely or partly encased in a relatively thin rubber material and wound into a shape essentially corresponding to that of the finished product. The core is embedded in a vulcanized rubber composition.

15 Claims, 2 Drawing Sheets

4,757,969

SAFETY BELT SYSTEM FOR CARS

BACKGROUND OF THE INVENTION

1. Field of the Invention

The present invention relates to a safety belt system for use in cars and the like, and which essentially comprises a fastener, a belt, if desired, with a coiling device, and attachment devices for securing the assembly to the fixed car structures. The invention, more specifically, relates to securing devices having qualities of flexibility.

2. Description of the Prior Art

In the car, and especially in the back seats of cars like station wagons and so called combined station wagons, where the seats can among other things, be folded back, there is a demand for flexibility mounting or securing, especially, safety belt fasteners. For securing safety belt fasteners, today, tapes of metal or synthetic fiber, single wire with a shrunk end member and so called shrunk double wire are used.

The above mentioned means for securing safety belt fasteners all have the disadvantage that they are not able to flex back after having been subjected to forces that displace the fastener from its correct position, so as to place said fastener in its original and correct position again. Said conditions usually occur in connection with folding back and folding up seats and the like. A disadvantage of, especially, wire as a fixing means is that due to structural reasons, e.g. shrunk end members, relatively elongated and bulky installations result which will easily get in the way, especially when the position of seats is changed. When the safety belt fastener is to be used it has to be pulled out manually and held in a certain position. In order to avoid such handling, rubber bands or some kind of hooking mechanisms are often used to secure the fastener, e.g. to the back rest of the seat. Various kinds of spring mechanisms are also used to return the fastener to its correct position after it was bent away. In case the safety belt fastener is secured by the aid of tape or the like, such tape may be provided with a stocking/sleeve of plastic or rubber reinforced with fibers so as to cause said fastener to flex back.

It is an object of the present invention to provide a device for securing safety belt fasteners where the above mentioned disadvantages are eliminated. More precisely, it is an object of the present invention to provide a device that is able to absorb great forces and, at the same time is not bulky, and has a degree of flexibility that will make it return the fastener to a predetermined position irrespective of the forces bending the fastener away and the influence of those forces, after such forces they have ended.

These objects are achieved according to the present invention with a safety belt system comprising a fixing device that is, essentially, characterized by the fact that it comprises a core consisting of fibrous material, preferably in the shape of a filament of ribbon, which is completely or partly encased in a relatively thin layer of rubber material and which is wound into a shape essentially corresponding to that of the finished fixing device, and that said encased core is surrounded by vulcanized rubber composition.

Other characteristic features of the safety belt system will appear from the following descriptions.

BRIEF DESCRIPTION OF THE DRAWINGS

The invention will now be disclosed in more detail with reference to two embodiments illustrated, inter alia, with in the drawing, wherein.

DETAILED DESCRIPTION

Figure 1:
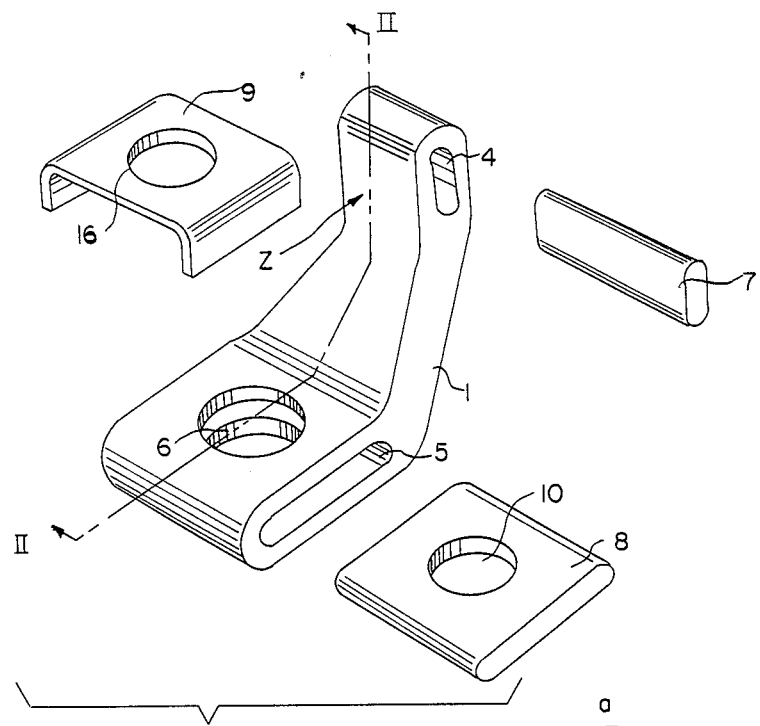
FIG. 1 is an exploded perspective view of an embodiment of a fixing device according to the present invention.
Figure 2:
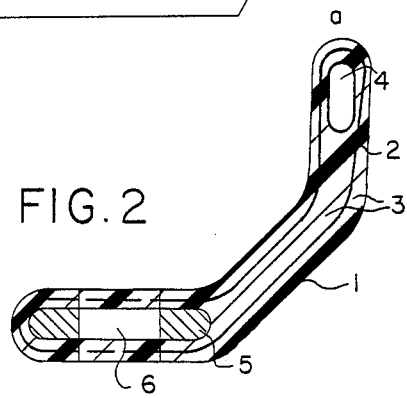
FIG. 2 is a cross-sectional view taken alown line II—II of FIG. 1.

FIG. 1 shows a first embodiment of a fixing device 1 and the basic structure thereof. The device has a core 2 consisting of a wound fibrous material which, having been provided with a primer, is encased in a relatively thin rubber material. 3 designates a vulcanized rubber composition in which the encased core is embedded. Fixing device 1 is provided with a recess 4 for receiving a securing bar 7 to be connected with the "ears" of a safety belt fastener (not shown). The fixing device is, furthermore, provided with a recess 5 for insertion of a lower fixing plate 8 having a hole 10 corresponding to hole 6 in fixing device 1. A clamping plate 9 is also provided with a hole 16 and is when mounted for use placed on top of fixing device 1, so that hole 11 is aligned with hole 6 fixing device 1, which is secured e.g. to a floor or bottom plate of a car by the aid of a bolt (not shown) extending through aligned holes 16, 6 and 10.

The fixing device according to the embodiment of FIG. 1 permits bending in all directions, but it is especially intended for being bent by the influence of forces in a direction indicated by arrow Z.

Figures 3, 4:
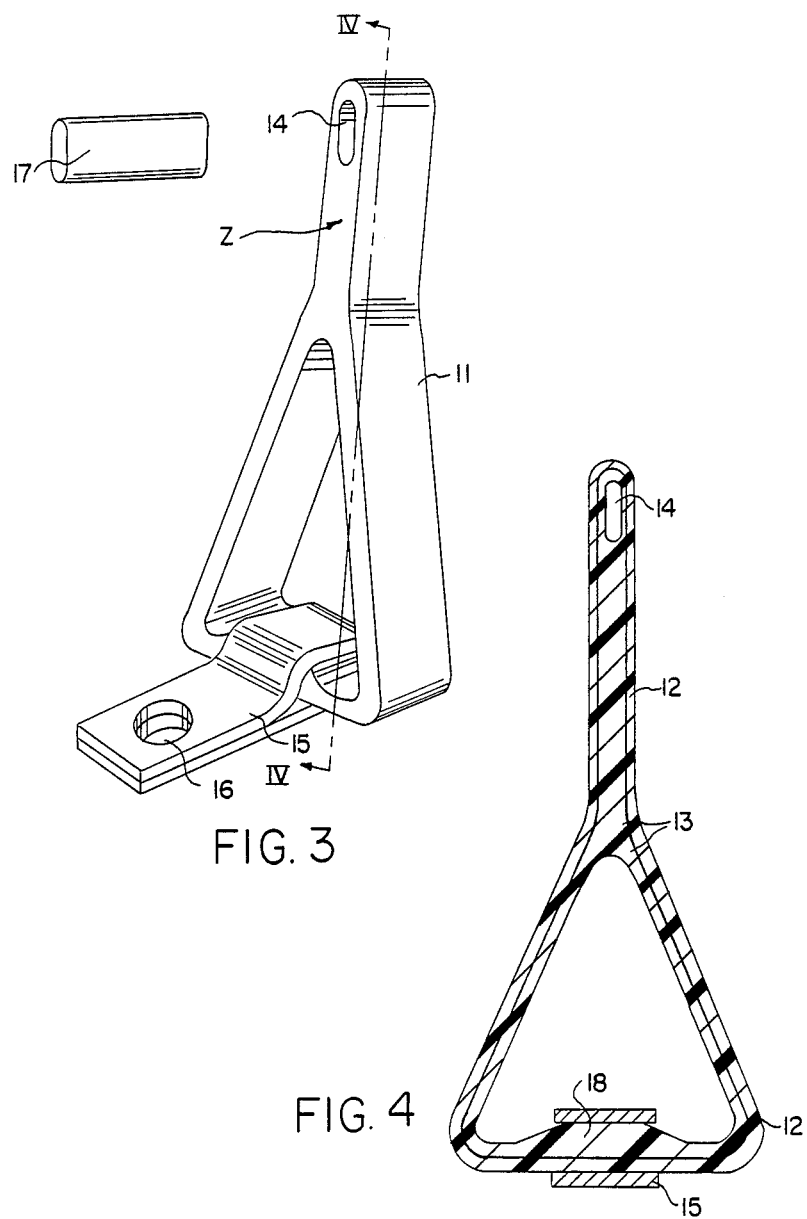
FIG. 3 is a view similar to FIG. 1 of a fixing device according to another embodiment of the invention.
FIG. 4 is a cross-sectional view taken along lines IV—IV of FIG. 3.

In FIG. 3 a second embodiment of fixing device 11 is shown, and the cross-sectional view of FIG. 4 shows the basic structure of the embodiment. Core 12 consists of a wound fibrous material which, after having been provided with a primer, is encased in a relatively thin rubber material. 13 designates a vulcanized rubber composition in which the encased fibrous material is embedded. Fixing device 11 is provided with a recess 14 for receiving a fixing bar 17 which is to be connected with the "ears" of a safety belt fastener not shown. By the aid of fixing yoke 15 said fixing device may be secured by the aid of a suitable bolt (not shown) through hole 16 to a floor or bottom plate of a car. As shown in FIG. 4, fixing device 11 is provided with a enlarged section of vulcanized rubber composition in area 18 where high bending forces are expected. The fixing device shown in FIG. 4 permits being bent in all directions but it is especially intended for bending in the direction indicated by arrow Z.

As will appear from the above description the fixing device for the safety belt system is according to the present invention basically a rubber product reinforced with fibrous material which may be single filaments and/or tape, or a plurality of fibers. The fibers used may be of any known kind, and the only requirements is that they have high mechanical strength. Suitable materials for the fibers include synthetic materials, e.g. polyester, polyamide, polythene, etc., and inorganic materials, e.g. glass, metal and similar materials. The composition of the vulcanized rubber surrounding the core and forming the mantle of the fixing device may be varied in accordance with its desired qualities of flexibility. The mantle may also be profiled by use of varying amounts of rubber composition in various areas of the fixing device, resulting in desired qualities as regards bendability and flexibility of said device.

I claim:

1. In a safety belt system for use in cars and similar vehicles including a connector, a safety belt, and a flexible fixing device for securing the system to the car, the improvement in a fixing device comprising:
   a core of fibrous material wound into a shape substantially corresponding to the desired shape of the completed fixing device;
   a relatively thin layer of rubber composition at least partly surrounding said fibrous material in at least partly encasing relationship therewith; and
   a layer of vulcanized rubber composition surrounding and embedding said core and thin layer of rubber composition thereon and having a thickness substantially greater than said thin layer of rubber composition.

2. A safety belt system as claimed in claim 1 and further comprising:
   a layer of primer material between said fibrous material and said thin layer of rubber composition.

3. A safety belt system as claimed in claim 2 wherein: said fibrous material is comprised of single filaments.

4. A safety belt system as claimed in claim 3 wherein: said fibrous material comprises polyester material.

5. A safety belt system as claimed in claim 3 wherein: said fibrous material comprises glass.

6. A safety belt system as claimed in claim 3 wherein: said fibrous material comprises metal.

7. A safety belt system as claimed in claim 1 wherein: said fibrous material is comprised of single filaments.

8. A safety belt system as claimed in claim 1 wherein: said fibrous material comprises tape.

9. A safety belt system as claimed in claim 1 wherein: said fibrous material comprises polyester material.

10. A safety belt system as claimed in claim 1 wherein: said fibrous material comprises polyamide material.

11. A safety belt system as claimed in claim 1 wherein: said fibrous material comprises polyethylene material.

12. A safety belt system as claimed in claim 1 wherein: said fibrous material comprises glass.

13. A safety belt system as claimed in claim 1 wherein: said fibrous material comprises metal.

14. A safety belt system as claimed in claim 1 wherein said fixing device has a shape comprising:
    a first planar terminal end portion;
    a second planar terminal end portion extending offset from and in a direction substantially perpendicular to the direction of said first terminal end portion;
    a web portion extending at an angle to and between and connecting said terminal end portions;
    a slot extending through and parallel to the plane of each said first and second terminal end portions;
    said core of fibrous material with said thin layer of rubber composition thereon having the shape of a loop having opposite ends extending around said respective slots;
    a hole extending through substantially the central portion of said first terminal end portion perpendicularly to the plane thereof and through said slot therein;
    a rectangular planar fixing plate in said slot in said first terminal end portion having a hole therein aligned with said hole in said first terminal end portion; and
    a clamping plate member on an outer side of said first terminal end portion and having a hole therein aligned with said hole in said first terminal end portion, said holes being adapted for receiving a fastening member for fastening said fixing device to the car.

15. A safety belt system as claimed in claim 1 wherein said fixing device has a shape comprising:
    a triangular shaped part;
    a planar part extending outwardly from one corner of said triangular shaped part and having an outer end;
    an elongated slot through said planar part adjacent said outer end thereof;
    a triangular shaped hole extending through said triangular shaped part;
    said core of fibrous material with said thin layer of rubber composition thereon having the shape of a loop having opposite ends extending around said slot and said triangular shaped hole;
    an enlarged vulcanized rubber composition portion on the side of said triangular shaped portion opposite said corner;
    a fixing yoke in the form of a strip member having a loop at one end portion thereof surrounding said enlarged portion and being overlapped at the other end portion; and
    a hole through said overlapped portion adapted to receive a fastener for fastening said fixing device to a car.

* * * * *